United States Patent
Kailas

(10) Patent No.: US 8,301,870 B2
(45) Date of Patent: Oct. 30, 2012

(54) METHOD AND APPARATUS FOR FAST SYNCHRONIZATION AND OUT-OF-ORDER EXECUTION OF INSTRUCTIONS IN A META-PROGRAM BASED COMPUTING SYSTEM

(75) Inventor: Krishnan Kunjunny Kailas, Tarrytown, NY (US)

(73) Assignee: International Business Machines Corporation, Armonk, NY (US)

( * ) Notice: Subject to any disclaimer, the term of this patent is extended or adjusted under 35 U.S.C. 154(b) by 24 days.

(21) Appl. No.: 11/493,665

(22) Filed: Jul. 27, 2006

(65) Prior Publication Data

US 2008/0028196 A1    Jan. 31, 2008

(51) Int. Cl.
*G06F 7/38* (2006.01)
*G06F 9/00* (2006.01)
*G06F 9/44* (2006.01)
*G06F 15/00* (2006.01)

(52) U.S. Cl. .......................... 712/227; 717/129; 717/127
(58) Field of Classification Search ................ 712/245; 717/129
See application file for complete search history.

(56) References Cited

U.S. PATENT DOCUMENTS

| | | | |
|---|---|---|---|
| 5,054,026 A | 10/1991 | Tsubota | |
| 5,187,793 A | 2/1993 | Keith et al. | |
| 5,390,103 A * | 2/1995 | Sakakibara | 713/375 |
| 5,699,536 A | 12/1997 | Hopkins et al. | |
| 5,812,811 A * | 9/1998 | Dubey et al. | 712/216 |
| 5,951,674 A | 9/1999 | Moreno | |
| 6,000,036 A | 12/1999 | Durham et al. | |
| 6,006,033 A | 12/1999 | Heisch | |
| 6,263,488 B1 | 7/2001 | Fortin et al. | |
| 6,286,134 B1 | 9/2001 | Click et al. | |
| 6,356,795 B1 * | 3/2002 | Barthel et al. | 700/82 |
| 6,378,124 B1 * | 4/2002 | Bates et al. | 717/129 |
| 6,463,582 B1 | 10/2002 | Lethin et al. | |
| 6,467,052 B1 | 10/2002 | Kaler et al. | |
| 7,209,868 B2 | 4/2007 | Kuo | |
| 2002/0032559 A1 | 3/2002 | Hellestrand et al. | |
| 2003/0167415 A1 | 9/2003 | Odaohhara et al. | |
| 2004/0148491 A1 * | 7/2004 | Damron | 712/34 |
| 2004/0230975 A1 * | 11/2004 | Gewirtz et al. | 718/100 |
| 2005/0010743 A1 * | 1/2005 | Tremblay et al. | 712/10 |
| 2005/0071438 A1 * | 3/2005 | Liao et al. | 709/214 |
| 2005/0172277 A1 * | 8/2005 | Chheda et al. | 717/151 |
| 2006/0161762 A1 * | 7/2006 | Eisen et al. | 712/233 |

OTHER PUBLICATIONS

Marcuello et al., Speculative Multithreaded Processors, International Conference on Supercomputing, 1998, pp. 77-84.*
Jeffery et al., A Lightweight Architecture for Program Execution Monitoring, Jul. 1998, pp. 67-74.*
*Prescott New Instructions Software Developer's Guide* "Next Generation Intel Processor Overview", Chapter 1, pp. 1-6, "Cpuid Extensions", Chapter II, pp. 2-12, "Instruction Set Reference", Chapter 3, pp. 3-40, "System and Application Programming Guidelines", Chapter 4, pp. 4-10, Appendix A, pp. A-1-2, and index.

(Continued)

*Primary Examiner* — Eddie P Chan
*Assistant Examiner* — George Giroux
(74) *Attorney, Agent, or Firm* — Daniel P. Morris; McGinn IP Law Group, PLLC

(57) ABSTRACT

A method and structure for an out-of-order processor executing at least two threads of instructions that communicate and synchronize with each other. The synchronization is achieved by monitoring addresses of instructions in at least one of the threads.

18 Claims, 8 Drawing Sheets

OTHER PUBLICATIONS

Ebcioglu et al., DAISY: Dynamic Compilation for 100% Architectural Compatability, Proceedings of the 24th Annual International Symposium on Computer Architecture, (ISCA-97), ACM Press, pp. 26-37, 1997.

Bala et al., "Dynamo: A Transparent Dynamic Optimization System", Proceedings of the 2000 ACM SIGPLAN Conference on Programming Language Design and Implementation (PLDI 2000), pp. 1-2, 2000.

Dehnert et al., "The Transmeta Code Morphing Software: Using Speculation, Recovery, and Adaptive Retranslation to Address Real-Life Challenges", Proceedings of the International Symposium on Code Generation and Optimization: Feedback-directed and Runtime, pp. 15-24, 2003.

A. Chernoff et al., "FX:32: A Profile-Directed Binary Translator", IEEE Micro., vol. 18, No. 2, pp. 56-64, Mar./Apr. 1998.

M. H. Lipasti, et al., "Exceeding the Dataflow Limit via Value Prediction", Proceedings of the 29th Annual IEEE/ACM International Symposium on Microarchitecture (MICRO 29), pp. 226-237, 1996.

* cited by examiner

METHOD AND APPARATUS FOR FAST SYNCHRONIZATION AND OUT-OF-ORDER EXECUTION OF INSTRUCTIONS IN A META-PROGRAM BASED COMPUTING SYSTEM

CROSS-REFERENCE TO RELATED APPLICATIONS

The present application is related to U.S. patent application Ser. No. 10/829,989, filed on Apr. 23, 2004, to Kailas, entitled "METHOD AND APPARATUS FOR A COMPUTING SYSTEM USING META PROGRAM REPRESENTATION", assigned to the present assignee, IBM Corporation, and incorporated herein by reference.

BACKGROUND OF THE INVENTION

1. Field of the Invention

The present invention relates to processors in data processing systems and, in particular, to out-of-order execution of multi-threaded programs, and, more specifically, to an out-of-order execution scheme for executing multiple threads of instructions in a meta-program-based processor.

2. Description of the Related Art

A sequential program includes a number of processor instructions that has a single control flow of execution (or single thread of execution), at any given time. In contrast, a multi-threaded program includes a number of interacting sequential threads, each specifying a concurrent thread of execution (or control flow).

A multi-threaded program specifies the interaction between its concurrent threads, using synchronization primitives to control the order in which the instructions of concurrent threads are interleaved during execution. The synchronization primitives, often implemented as atomic memory access instructions or serialization instructions, are essential for the correctness of multi-threaded programs. They are also the building blocks used to define "critical sections" in programs in order to prevent simultaneous updates to shared data by multiple threads.

Clearly, a processor executing instructions of a multi-threaded program must execute instructions in such a way that it honors all the synchronization primitives specified by the program, in order to avoid non-deterministic and erroneous program execution. In general, in a traditional multi-threaded program execution environment, the following two primitive operations are involved in synchronizing or communicating between a pair of threads A and B:

(1) Thread A signals thread B by writing to a shared address space; and (2) If thread A is blocked, it resumes execution by reading from the shared memory address space and comparing the data written by thread B to an expected value.

In a processor, both of the above operations involve:

(a) computing the address of the shared memory location; and (b) carrying out the memory access (load or store) operation.

One problem inherent in this process is that the latency of a memory access operation is unpredictable, often taking several cycles, causing slow synchronization/communication between the threads. Therefore, it is important to make the thread synchronization/communication operations faster and more efficient to achieve higher performance for multi-threaded programs.

The document entitled "Prescott New Instructions—Software Developer's Guide", No. 252490-001, February, 2003, published by Intel Corporation, describes a technique to speed up inter-thread synchronization using two new instructions, MONITOR and MWAIT. The MONITOR instruction is used for defining (i.e., to setup) the address range to be monitored by the MWAIT instruction, whereas the MWAIT instruction waits for a write to a specific address range specified by the MONITOR instruction. These two instructions are used to implement a "triggering address range."

Any writes to a specified address range is detected using an MWAIT instruction without accessing/reading the data stored in the memory address range, and, thus, can be used for providing slightly faster synchronization. This technique avoids operation (2) above by monitoring the addresses written by thread A instead of reading the data.

Meta-Program-Based Processors

A meta-program-based computing system provides an even more efficient and faster synchronization technique by eliminating operation (1), as well as both the associated address generation and memory access operations.

That is, the meta-program-based computing provides a fundamentally different way of executing multi-threaded programs. In a meta-program-based computing system, such as exemplarily described in the above-identified co-pending application, the address of the main program is used by the meta-program to monitor and follow execution path (or more precisely, the control flow graph) of the main program and change its execution behavior.

Threads in a meta-program-based computing system do not have to write to a specific memory location for a pair of "threads" to synchronize. Instead, thread B can just monitor one or more specific instruction addresses of thread A (where the store instructions should have been in the traditional model of multi-threaded computation). Note that the instruction address to be compared against is generated for free by the next-instruction-address generation logic of the processor.

Thus, meta-program-based computing provides a simpler technique for thread synchronization because it eliminates both operations (1) and (2). The meta-program-based thread synchronization is faster too, because it involves a simple comparison of two addresses, an operation that can be done early in the pipeline.

A meta-program-based computing system may be developed using either an in-order processor or an out-of-order processor. An out-of-order processor, such as the IBM POWER4™ processor, tries to execute instructions from a thread in an order different from the order in which they appear in the program. In an out-of-order processor with simultaneous multithreading (SMT), such as an IBM POWER5™ processor, instructions are executed from multiple threads out of order.

Several conventional techniques have been developed to ensure that multithreaded programs execute correctly on such out-of-order processors. The entire conventional techniques used by these contemporary processors describe different ways to hold the commit results of the oldest instruction until an acknowledge signal arrives from the synchronization point in the memory hierarchy, or enforce strict serialized execution for certain instructions.

In a meta-program-based system, since shared memory is not used for synchronization, there is no need to wait for such a signal. Instead, to implement the correct thread synchronization and communication operations as specified by the threads, newer techniques are needed.

Furthermore, out-of-order processors often fetch instructions speculatively from predicted execution paths. Since a meta-program follows the execution of the main program (a different thread), the speculatively fetched instructions of the main program may cause the meta-program fetch (MP-fetch) stage to speculatively fetch meta-program instructions, if any, along the speculative execution path of the main program.

Clearly, an out-of-order execution engine is needed that can allow the speculative execution of both meta-program and main program instructions and discard the speculative execution results of both threads whenever the speculation turns out to be wrong. While the implementation of such an instruction-level light-weight synchronization execution model needed for meta-program-based computing on an in-order processor is straight forward, as exemplified by the description in the above co-pending application, an efficient implementation of an out-of-order processing engine that would not degrade its performance, while executing programs concurrently with meta-programs, is not obvious.

A naive solution to this problem would be to "halt" instruction fetch (possibly by steering the instructions into a side buffer as done in some of the high frequency processor pipeline designs) until the synchronization condition or the outcome of the prediction is resolved. However, such a solution not only requires additional hardware structures but also affects the performance by inhibiting concurrent, speculative and out-of-order execution opportunities for both meta-program and main-program instructions.

Therefore, a need exists for a method to efficiently synchronize multiple threads in an out-of-order processor, particularly one that implements speculative executions, without affecting the performance.

The current invention provides a better solution to this problem via a new method and apparatus for implementing a meta-program execution engine for an out-of-order processor.

SUMMARY OF THE INVENTION

In view of the foregoing, and other exemplary problems, drawbacks, and disadvantages of the conventional systems, it is an exemplary feature of the present invention to provide a structure (and method) for throttling the instruction fetch and controlling the completion order of the instructions in order to enforce thread synchronization in an out-of-order processor implementing a meta-program-based computing system.

The technique that is exemplarily described is based on generating and assigning special unique instruction tags for all the instructions fetched, and using a number of instruction-specific tag comparisons at the completion unit of the processor according to the synchronization semantics specified by the threads.

To achieve the above features and others, in a first exemplary aspect of the present invention, described herein is an apparatus including an out-of-order processor executing at least two threads of instructions, wherein the synchronization of the at least two threads is achieved by monitoring addresses of instructions of one of the threads.

In a second exemplary aspect of the present invention, also described herein is a method upon which the apparatus operates.

In a third exemplary aspect of the present invention, also described herein is a signal-bearing medium tangibly embodying a program of machine-readable instructions executable by a digital processing apparatus to perform the method.

Thus, the present invention provides a simple, efficient, and fast method to synchronize threads in an out-of-order machine.

BRIEF DESCRIPTION OF THE DRAWINGS

The foregoing and other exemplary purposes, aspects and advantages will be better understood from the following detailed description of an exemplary embodiment of the invention with reference to the drawings, in which.

DETAILED DESCRIPTION OF AN EXEMPLARY EMBODIMENT OF THE PRESENT INVENTION

Figure 1:
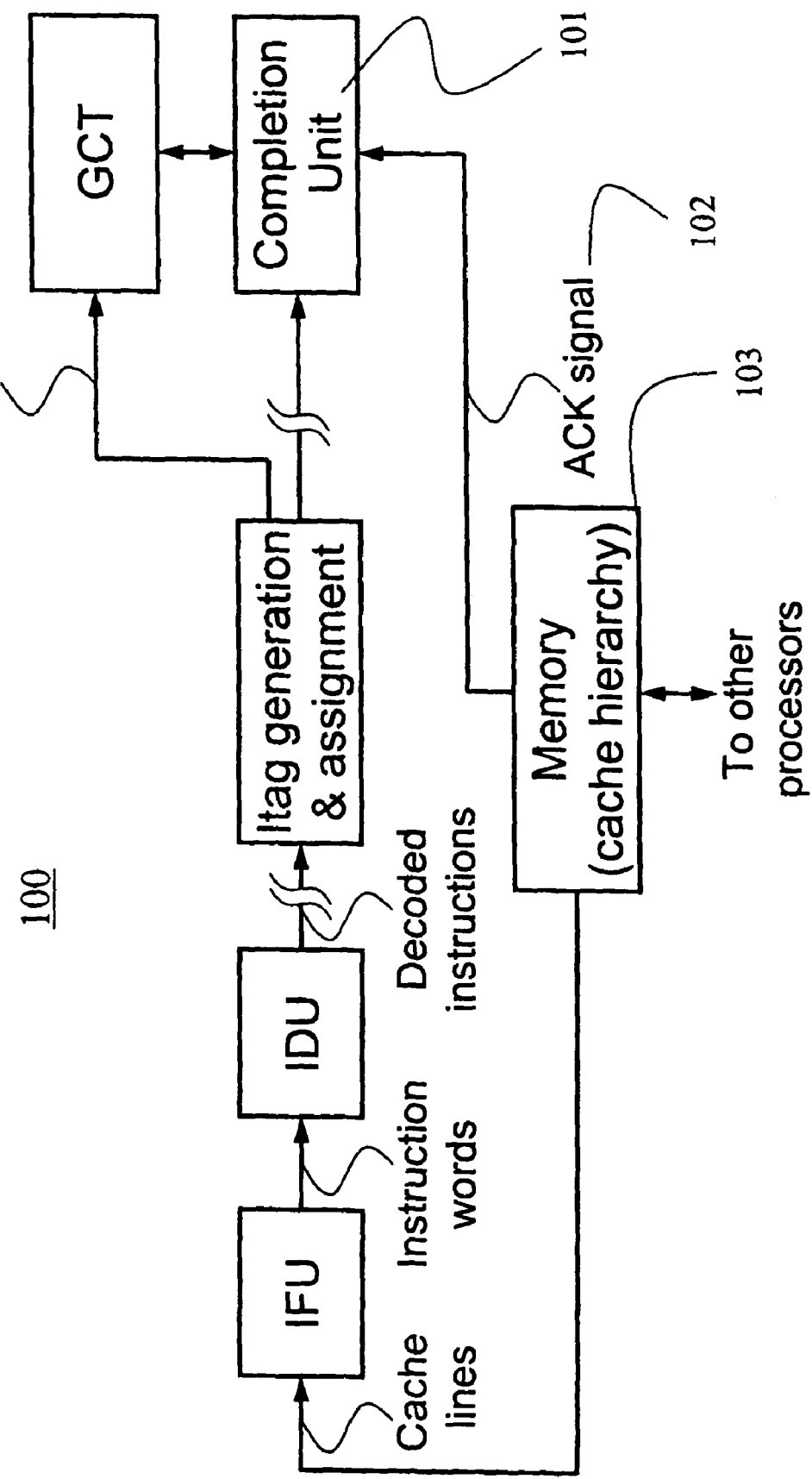
FIG. 1 illustrates a conventional scheme 100 for keeping track of instructions of threads in an out-of-order processor.

Referring now to the drawings, and more particularly to FIGS. 1-9, there is shown an exemplary embodiment of the method and structures according to the present invention.

It is noted, as a preliminary point, that instructions of multiple threads are executed asynchronously in an out-of-order processor unless the programmer/program specifies that threads have to synchronize at some points during execution (for example, to avoid multiple threads trying to update a shared memory location). The execution is synchronized only at those points. In general, it is desired that instructions execute asynchronously, in an out-of-order manner, speculating the control flow paths, in order to get good performance. At the same time, it is desired as well to synchronize the execution of multiple threads (wherever it is needed in the program) using the least amount of overhead.

Out-of-order processors use a number of techniques for waking-up and issuing a set of instructions in its instruction window for execution in an order different from the order in which they are specified in the program (i.e., the "program order"). In an out-of-order processor, the target registers of the instructions are renamed prior to execution. The renamed data-ready instructions are selected for execution from a set of instructions residing in an instruction buffer, reservation station, or issue queue. The instructions that have completed execution are retired strictly in the program order, in order to support precise exceptions.

In other words, the architected state of the processor is always updated in program order, the oldest instruction first. The completion logic of an out-of-order processor keeps track of the oldest instruction of each thread by maintaining a pointer to the oldest instruction. This pointer is updated after completing an instruction.

In a traditional computing environment where multi-threaded programs are interacting with each other via shared memory, the completion logic of the processor have to ensure not only that the oldest instruction of a given thread is completed first, but also that the completing oldest instruction of any active threads does not violate the memory consistency model of the processor. This is typically achieved in contemporary processors by delaying the completion of the oldest instruction accessing memory until an acknowledge signal is arrived from the memory coherence point, often the second-level cache, in the memory hierarchy.

FIG. 1 illustrates this conventional scheme 100, wherein completion unit 101 awaits receipt of the ACK signal 102 from a system cache 103. The remaining components shown in FIG. 1 will be described in view of their significance relative to the present invention.

In a meta-program-based computing system, since the synchronization between a pair of threads is specified in terms of the address of an instruction, a different criterion is needed for determining the correct relative order of execution and completion of instructions of the threads.

The semantics of concurrent execution of a meta-program thread and main program thread specifies that instructions of a meta-program cannot be completed earlier than a certain main program instruction whose address was used for synchronization between the two threads. This semantic also indicates that if an instruction of one of the threads was flushed, then the "corresponding" instructions of the other thread will also have to be flushed. Flushing (discarding the execution results) of speculative instructions is quite common in an out-of-order processor, primarily due to branch misprediction.

Figure 2:
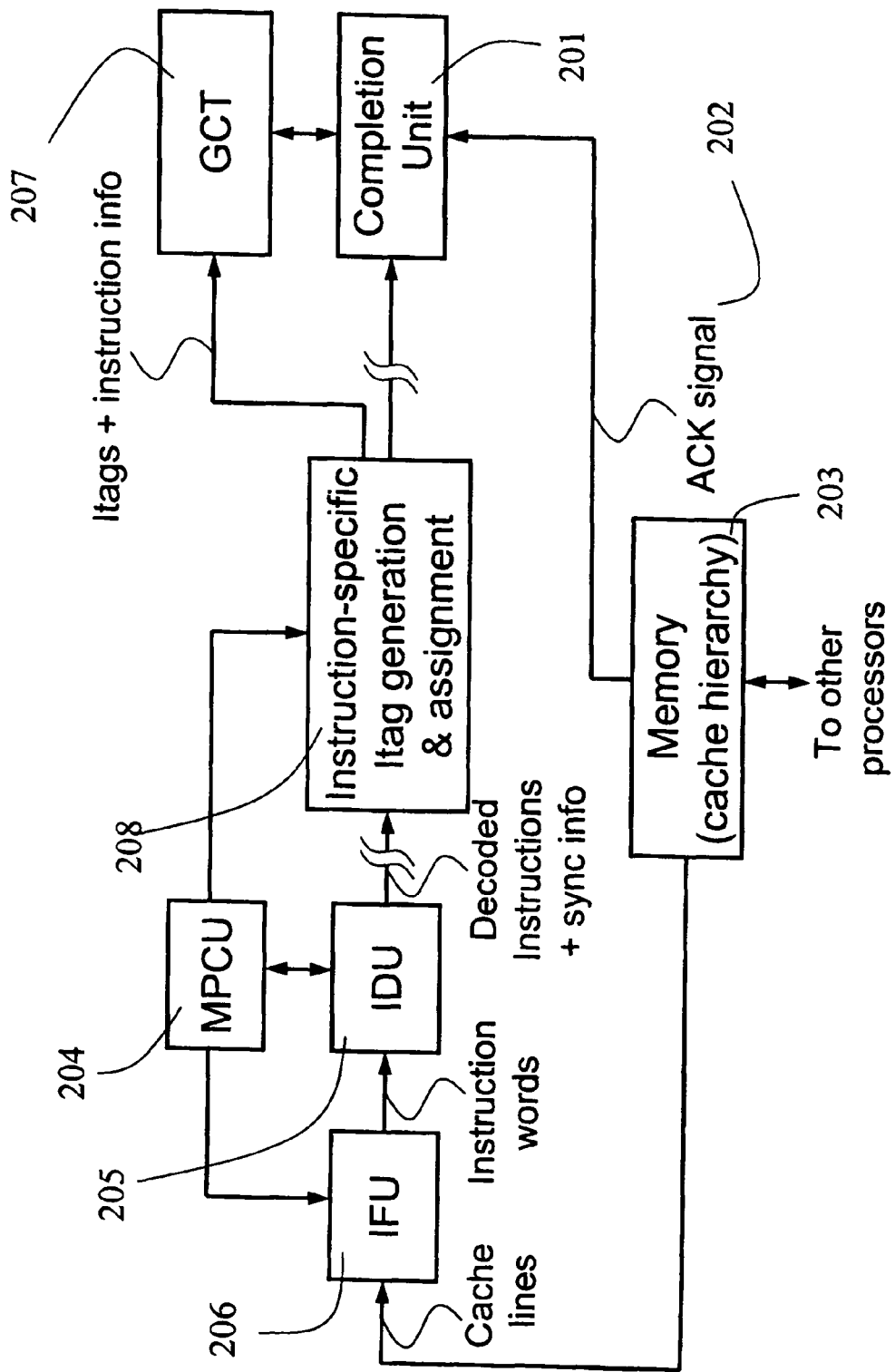
FIG. 2 illustrates an exemplary system 200 that incorporates concepts of the present invention.

Turning now to the FIG. 2, a key function of the exemplary embodiments of the present invention is executed by a Meta-Program Control Unit (MPCU) 204 that works in parallel with the instruction decode unit (IDU) 205 of the processor to generate information for creating unique meta-program instruction tags that are discussed below. Components 201-203 in FIG. 2 correspond respectively to the completion unit 101, ACK signal 102, and cache 103 mentioned for FIG. 1, as modified in the manner described below.

In summary of the concepts of the present invention, in view of the above discussion, in an exemplary embodiment, a new instruction tag generation scheme is described that makes use of some information produced by MPCU 204. In another aspect of this exemplary embodiment, a method is described for advancing the pointer used to keep track of the oldest instruction to be completed next based on the meta-program instructions. This method allows the meta-program to synchronize and control the execution of the main program thread in an out-of-order processor without affecting its ability to execute instructions speculatively. In yet another aspect, a mechanism is provided to selectively flush speculative instructions from both main-program and meta-program threads.

Meta-Program-Based Processors

The above-identified co-pending application provides a description for implementing a meta-program-based computing system by controlling the instruction fetch stage of the pipelines used for executing meta-program and main program instructions.

Briefly, in that method, a first pipeline is established for executing the main program, and a second pipeline is established to execute a meta-program that fetches and/or stores meta-program information of executing the main program. The meta-program information includes execution characteristics of the main program and/or results of an analysis of that execution. The main program is not modified by establishing the second program or by executing the meta-program. The meta-program follows the execution of the main program, and it can modify the execution behavior of the main program as well.

Figure 3:
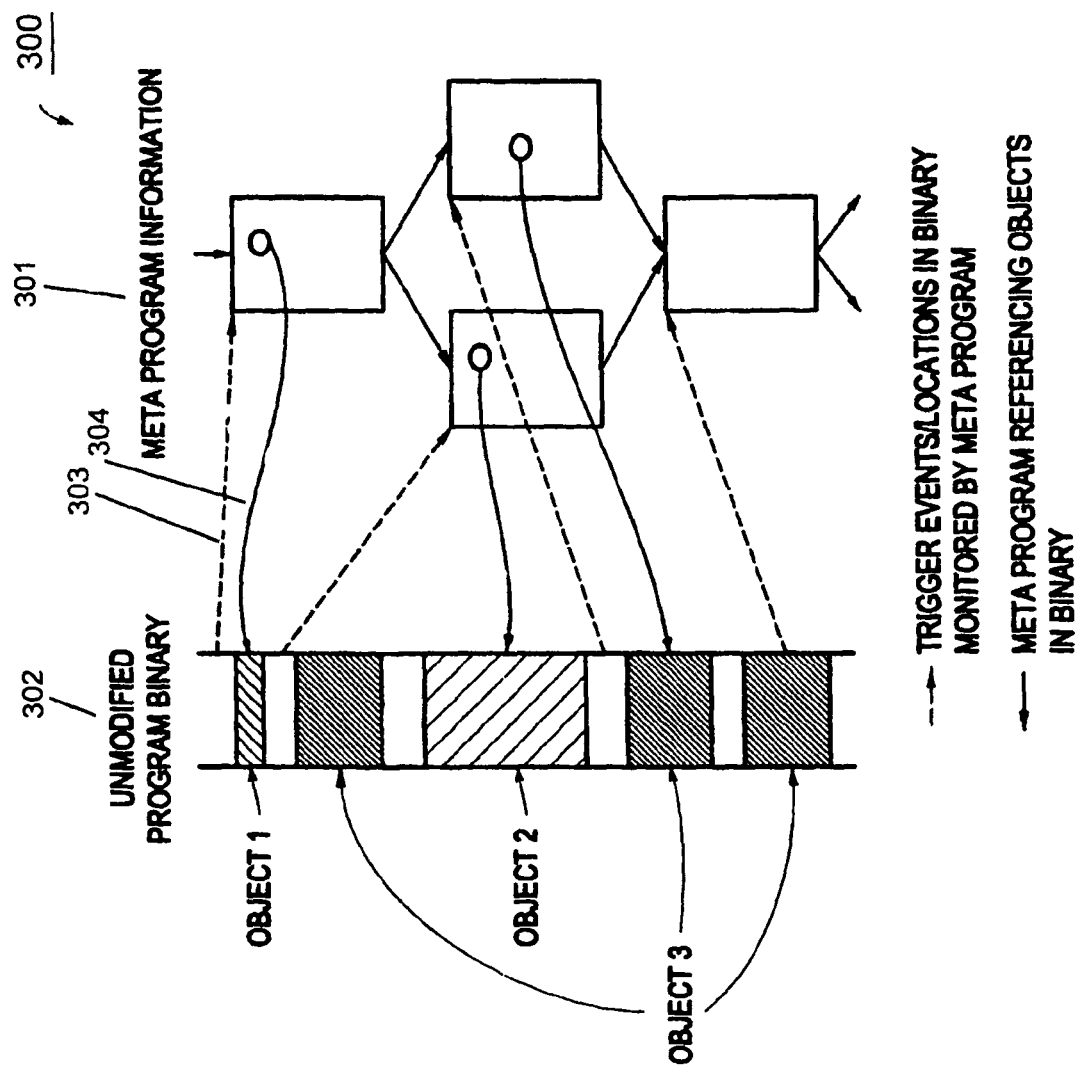
FIG. 3 illustrates exemplarily a process 300 of generating meta-programs from a main program and the meta-program information associated with it.
Figure 4:
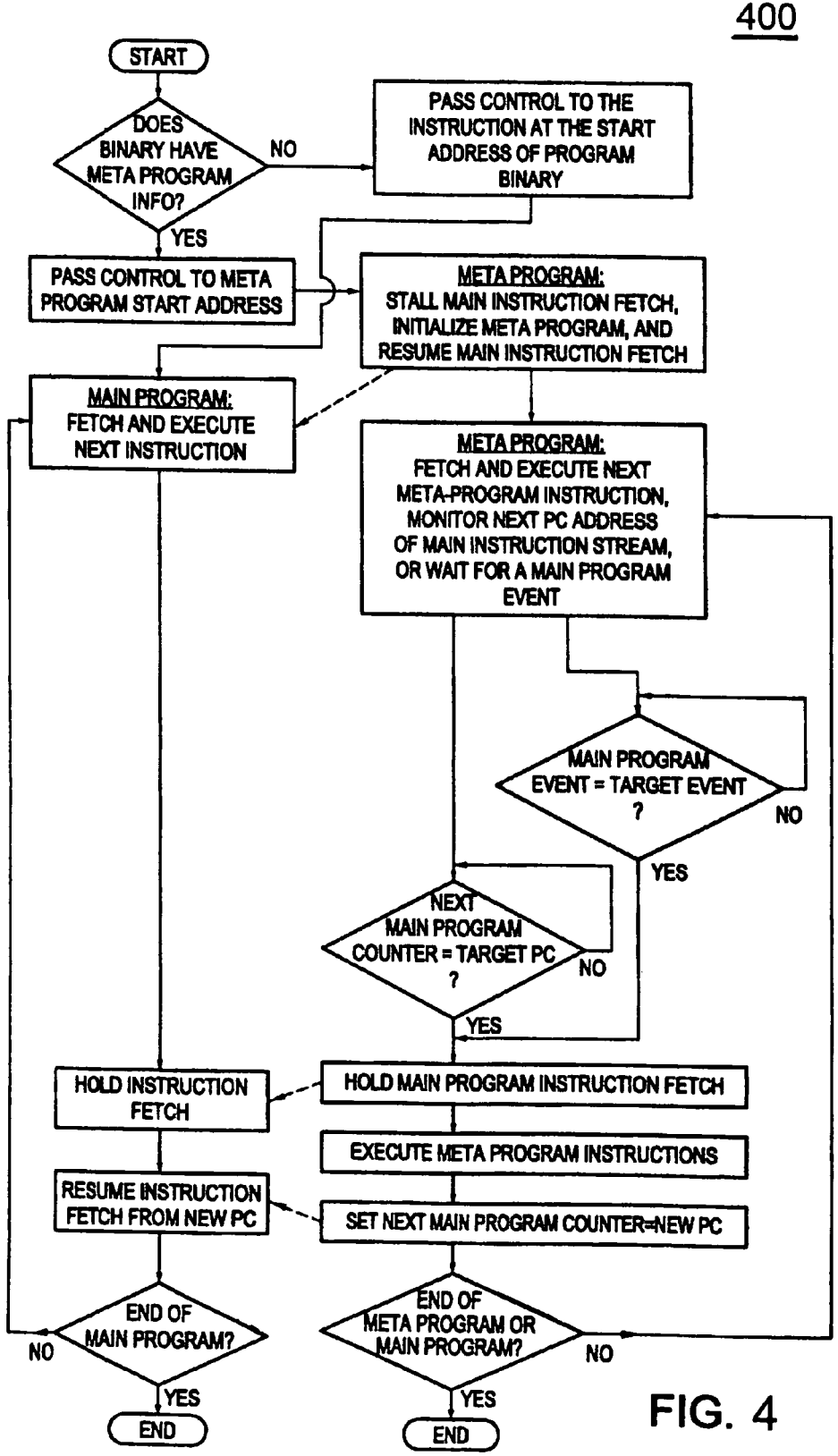
FIG. 4 illustrates an exemplary flowchart 400 that shows interchanges of control and information between a main program and a meta-program.

Some of the concepts discussed in this co-pending application are shown in FIGS. 3 and 4, wherein FIG. 3 shows a typical meta-program generation process 300. A meta-program is generated based on the meta-program information 301 as well as the synchronization and control/data transfer requirements between the main program 302 and the meta-program as defined by the main program control flow. FIG. 3 shows the exchange 304 of information between the meta-program and the main program 302, as initiated by an event 303 in the main program 302 (such as fetching a specific main program instruction monitored by meta-program).

The flowchart 400 in FIG. 4 demonstrates how such concurrent co-routine style meta-program execution is established and when to pass control/information between the main program and the meta-program. These diagrams were extensively discussed in the above-identified co-pending application.

Speculative Out-of-Order Processing of Meta-Program and Main-Program Instructions The present invention describes a different technique for implementing a meta-program-based computing system that would allow both meta-program and main-program instructions to execute in an out-of-order, as well as, speculative manner.

For purpose of explaining the concepts of the present invention, a selected number of instructions available in the meta-program environment are described below that demonstrate the method of implementing the correct execution behavior of meta-program instructions as to be used for synchronization in an out-of-order processor. These instructions, used only as examples for the following discussion, are:

Wait for Program Counter (WPC)
Halt Instruction Fetch (HIF)
Resume Instruction Fetch (RIF)
Swap program counter (SPC)

Figure 5:
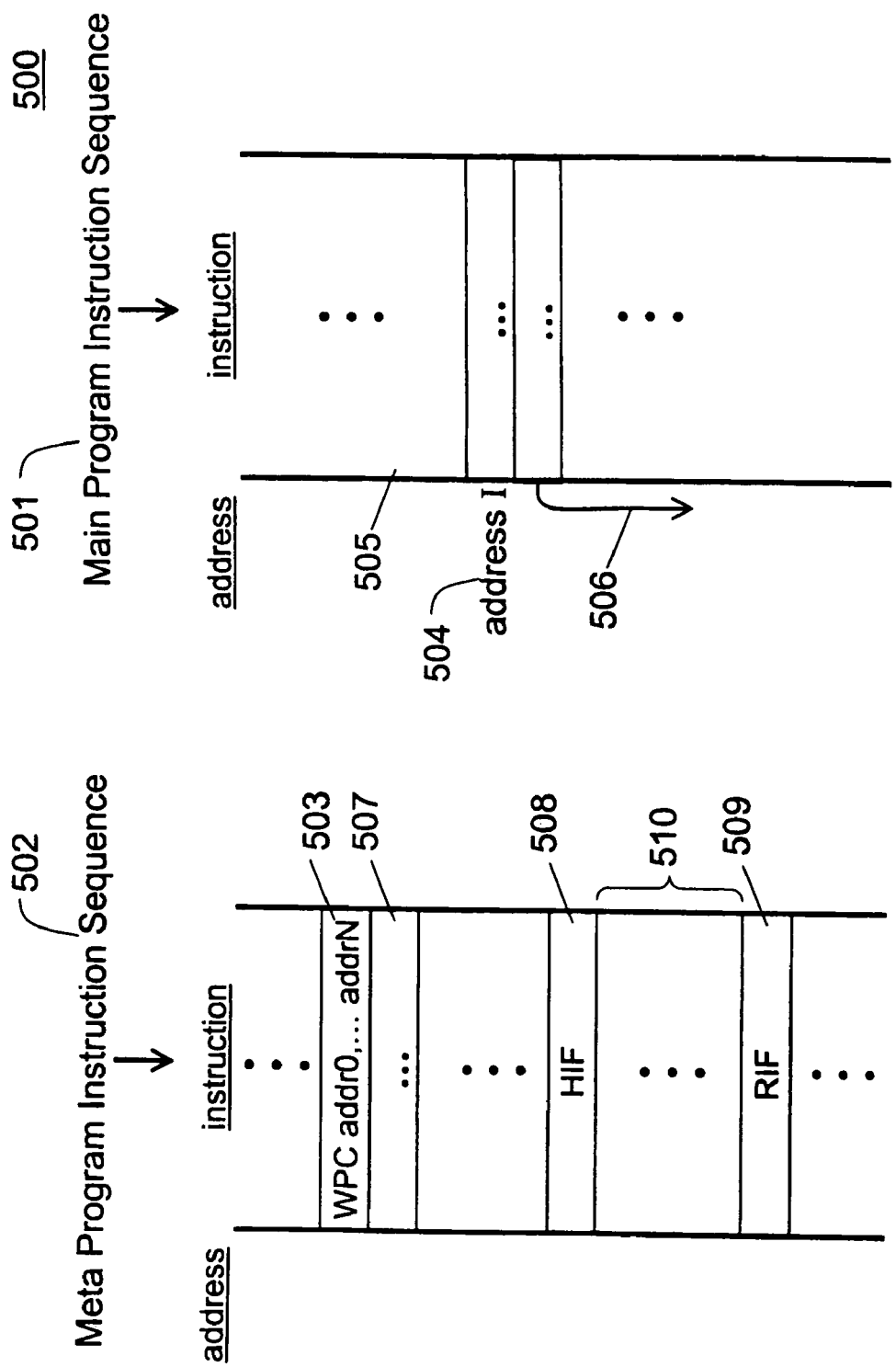
FIG. 5 illustrates exemplary code sequences that demonstrate interactions between the main program and the meta-program for various of the instructions discussed.

As demonstrated in FIG. 5 and the following discussion, there is much interleaving between the main program and the meta-program instructions constraint by these specific meta-program instructions listed above. The interleaving constraints specified by those meta-program instructions, therefore, specify the partial instruction order required to honor the inter-thread data dependencies between meta-program and main program instructions. This implies that, in an out-of-order processor, the register re-naming scheme must also take into account the program order specified by those meta-program instructions.

To illustrate these instructions, FIG. 5 generically shows sections of code sequence 500 for the main program 501 and for the meta-program 502.

The Wait for Program Counter (WPC) instruction is a serializing instruction common to both threads. It intercepts the main program execution only when a main program instruction at a given address specified by the WPC instruction operand is encountered. The instruction "WPC address0 . . . addressN" 503 directs the processor to monitor the stream of instructions fetched by the other thread (the main program 501) and to intercept the thread when an instruction at one of the addresses specified (address0 . . . addressN) by the instruction operands is fetched (e.g., addressI 504). All the main program instructions 505 at addresses prior to the address specified by the operand of WPC instruction 503 must be completed before that WPC instruction can be completed.

All the main program instructions 506 fetched after the instruction at the address specified by the operand will be executed only after executing the meta-program instruction 507 immediately following the WPC instruction. The instruction 507 following a WPC instruction can be another WPC instruction, in which case, the main program continues its execution until a main program instruction with an address specified by the target address operand of the second WPC instruction is fetched.

The Halt Instruction Fetch (HIF) instruction 508 directs the processor to stop the instruction fetch of the main program thread, whereas the Resume Instruction Fetch (RIF) meta-program instruction 509 directs the processor to resume the instruction fetch of the main-program thread. In other words, the set of meta-program instructions 510 sandwiched between HIF and RIF instructions 508, 509 will be executed strictly after the main program instruction blocked by the HIF instruction.

However, as will be explained later, it is not necessary to halt instruction fetch to emulate the execution behavior of HIF and RIF instructions 508, 509. The execution of HIF instruction 508 is deterministic only when it is the immediate successor to a WPC instruction 503.

Unlike other meta-program and main-program instructions, the WPC instruction 503 (or any similar meta-program instruction monitoring the main program execution, even though the WPC instruction is exemplarily referred to in the following discussion) only affects the state of the processor related to monitoring the main-program control flow. This state information, such as the instruction addresses or events currently monitored by the meta-program, is updated as soon as a new control-flow-monitoring meta-program instruction is decoded.

This operation is important, since it can potentially cause the meta-program to lose control over the main-program execution. The meta-program instructions are fetched continuously until a WPC instruction is fetched and decoded. Once such a meta-program instruction is identified by the instruction decode unit (IDU) 205, the instruction fetch unit (IFU) 206 of the processor is notified to stop fetching meta-program instructions further until the main program instruction being monitored is fetched (e.g., the instruction at addressI 504 of the WPC instruction shown in FIG. 5). It is noted that, in a single threaded processor (i.e., a processor that can fetch instructions from only one thread at a time), this procedure involves a switching of processing of the meta-program instructions to the fetching and processing of main program instructions. However, in a multi-threaded processor that can fetch instructions from multiple threads concurrently this "switching" is not needed, as main program instructions are fetched in parallel.

Similarly, the IFU 206 is notified by the MPCU 204 to stop fetching main-program instructions further, until another WPC instruction is fetched and decoded. This scheme ensures the correct meta-program execution behavior in the presence of instruction cache or TLB misses in an out-of-order execution processor.

As briefly explained earlier relative to FIG. 2, relative to the conventional scheme shown in FIG. 1, in an out-of-order processor 200 implementing the present invention, the meta-program computing model is exemplarily implemented by adding a new meta-program control unit (MPCU) 204 logic block in parallel to the IDU 205. The MPCU 204 executes the WPC instructions decoded by the IDU 205 by comparing the addresses of the main-program instructions with the address(es) specified by the operand(s) of WPC instruction(s).

The MPCU also sets a new bit, the MetaProgram Target bit, in the decoded instruction words of those main-program instructions that are monitored by the meta-program instructions such as WPC. The MetaProgramTarget bit will be used by the instruction tag creation logic to generate instruction tags for the meta-program instructions later in the processor pipeline. It also copies the address (or program counter) of the main program instruction to the corresponding decoded WPC instruction word, which will also be used subsequently by the instruction tag creation logic.

Figure 6:
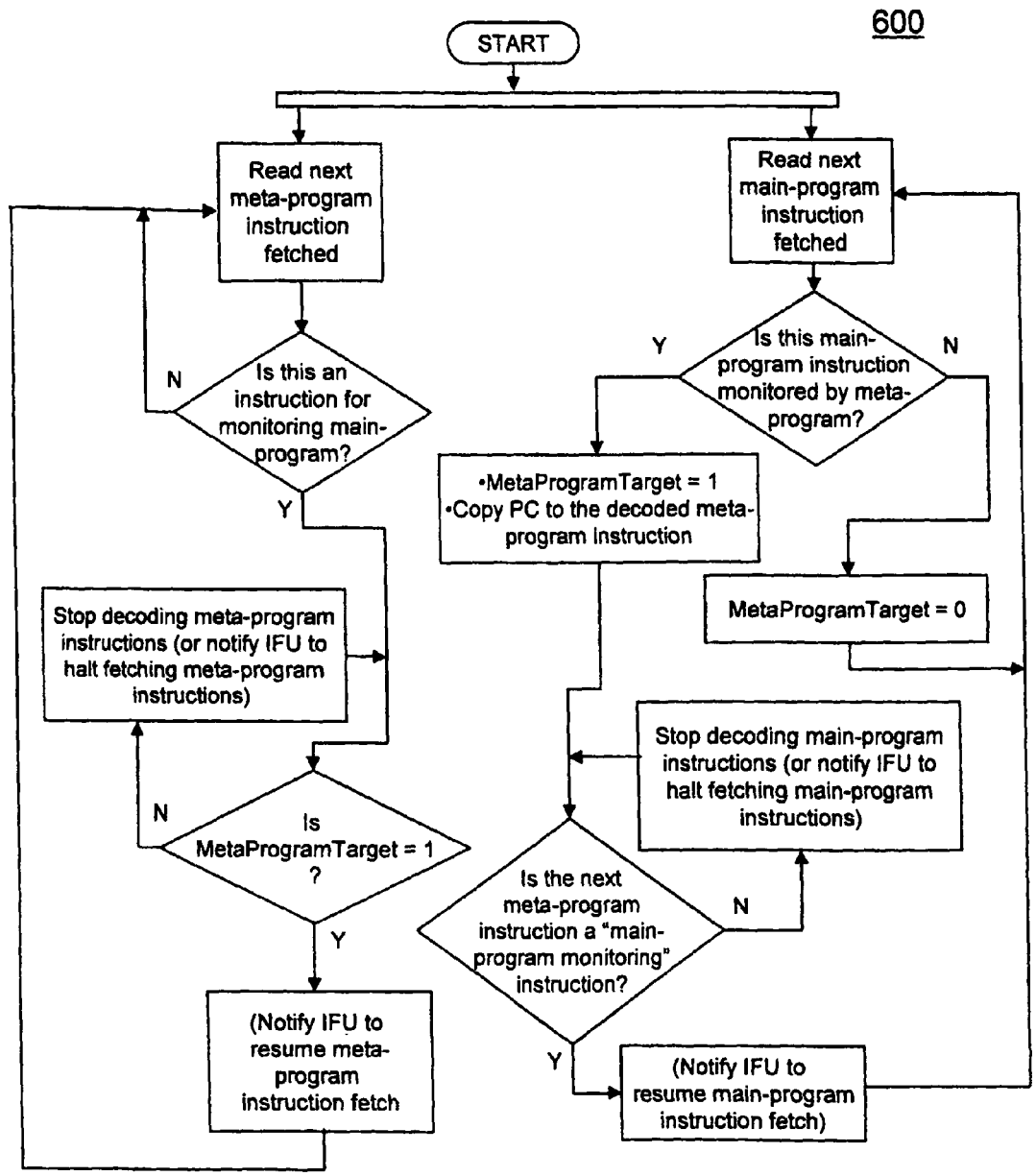
FIG. 6 illustrates an exemplary flowchart 600 of a Meta-Program Control Unit (MPCU) of the present invention.
Figure 7:
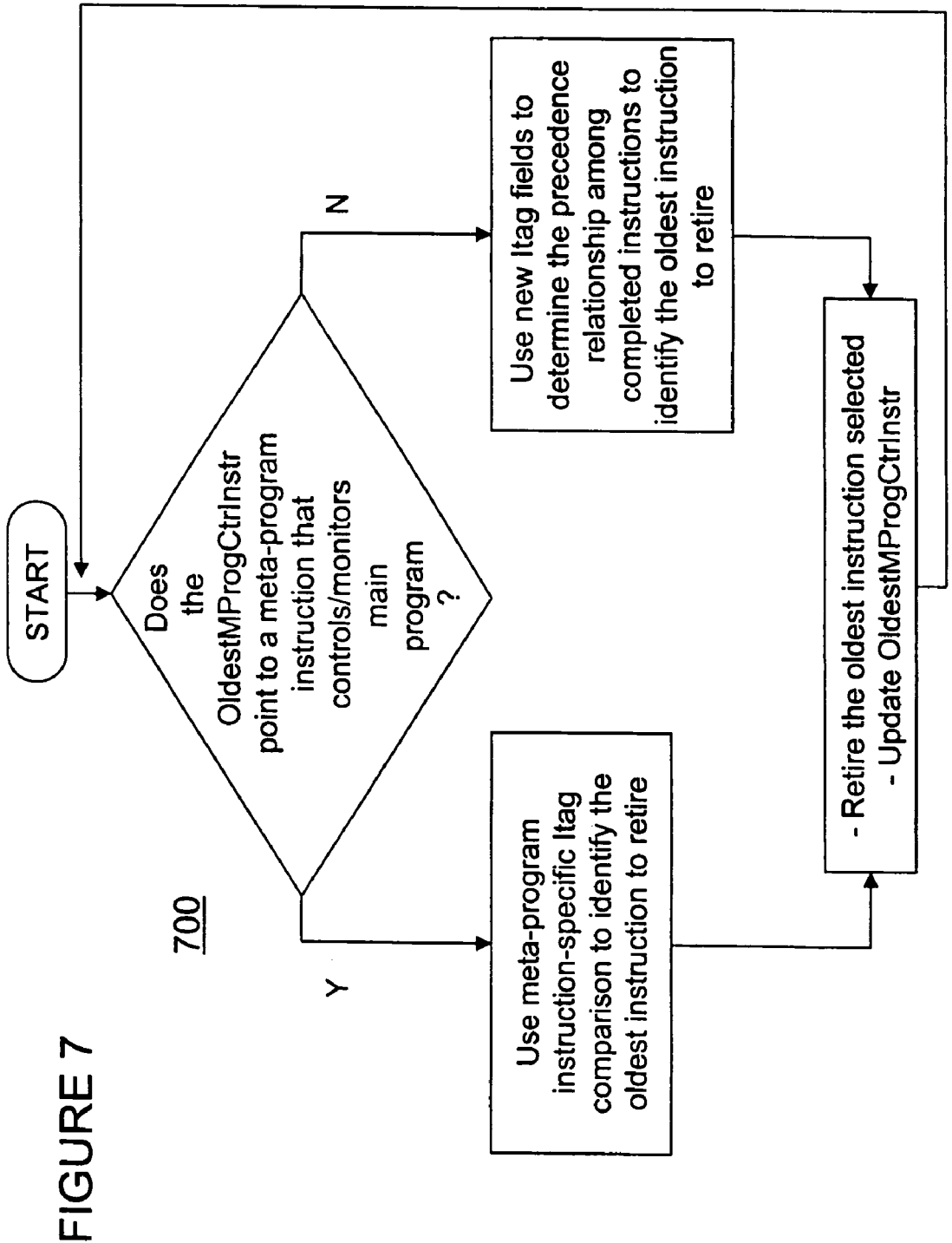
FIG. 7 illustrates an exemplary flowchart 700 of a Completion Unit of the present invention.
Figure 9:
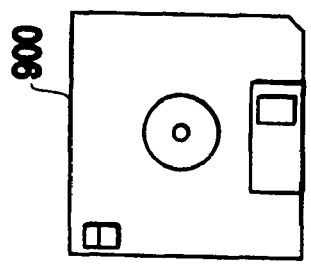
FIG. 9 illustrates a signal bearing medium 900 (e.g., storage medium) for storing steps of a program of a method according to the present invention.

Additional details of the operation of the MPCU 204, as summarized in the description above, are provided in the flowchart 600 shown in FIG. 6.

Although the components discussed above in the exemplary embodiment would typically be hardware blocks that are part of the processor pipeline, with the meta-program being the only software component, the concepts of the meta-program execution can also be implemented on a virtual machine (VM). An example of a virtual machine is the "code morphing" (or binary translation) software used by Transmeta's Crusoe® processors to run Intel® x86 instructions on a VLIW processor having different set of instructions. A VM can execute instructions (and thus the programs written) for a processor A on a different processor B using a combination of software (binary translation) and hardware structures. That is, a VM can emulate the execution of instructions of a different processor.

Thus, the present invention is not intended as being limited to the exemplary hardware implementation primarily being used for explanation, but is intended as extending to implementations involving a software layer, or virtual machine, and to a combination of VM and the apparatus (hardware) described herein.

Meta-Program Instruction Tags

In an out-of-order processor, the instructions are internally tracked using a unique instruction tag or Itag assigned to it. Unique Itags with monotonically increasing values are assigned to the instructions in the program order in any stage (typically, in the decode stage) after the instruction fetch stage and prior to the dependency checking and renaming stages of the conventional out-of-order processor pipeline. Incrementing Itags values beyond the maximum value allowed by the bit width of the Itag storage causes it to wraparound and reset to zero. However, an additional bit can be used to distinguish the wraparound condition such that Itags can be age compared.

Clearly, assigning unique Itags, as in the conventional scheme, possibly using the thread IDs of the main-program and meta-program threads, cannot help encode the inter-thread dependency constraints. Therefore, in the present invention, a new scheme is used for creating a different type of unique Itags and assigning them, as described in the following. These new instruction-dependent Itags will be used for efficiently implementing various kinds of synchronization specified by the meta-program instructions.

Accordingly, in the present invention, a unique instruction tag (Itag) is created for each meta-program, as well as main-program, instruction. The main program instructions are still assigned Itags with monotonically increasing values, as in the conventional method. However, the meta-program instructions are now assigned a new type of Itags, which is a concatenation of a main-program Itag and a monotonically increasing number (the "Meta-program instruction ID") that is incremented for each new meta-program instruction. The format of the meta-program instruction Itag of the present invention is given below.

| Main-Itag | Meta-program instruction ID |
|---|---|

Note that, in this new meta-program Itag format, the Main-Itag will be the same for all meta-program instructions associated with a given main program instruction. A meta-program instruction is said to be associated with a main program instruction residing at address A if it is either:

1. A WPC instruction that was waiting for the main program instruction at address A; or
2. A non-WPC instruction in the meta-program thread that was after the above mentioned WPC instruction (waiting for main program instruction residing at address A) in the program order.

In other words, for any WPC instruction in the meta-program execution trace, its associated main-program instruction is defined as the main program instruction it intercepted. For any non-WPC instruction in the meta-program execution trace, its associated main-program instruction is defined as that main program instruction which was intercepted by its nearest predecessor WPC instruction in the meta-program instruction stream.

Given this new meta-program Itag scheme just described above, the sequential execution semantics of meta-program instructions can be enforced by the Meta-program instruction ID portion of the Itag. The meta-program Itags and main program Itags are compared to identify the correct order of execution of instructions and source dependencies during renaming. In order to make a direct comparison between Itags, the main program Itags are logically extended by padding it with zeros at the least significant bit positions such that both main- and meta-program Itags have the same width as shown below.

| Main-Itag | Meta-program instruction ID |
|---|---|
| Main-Itag | 000 . . . 0 |

Note that an invalid interleaving of main- and meta-program instructions during execution can cause wrong source instruction dependencies, causing wrong results to be forwarded as well as committing execution results in wrong order to the architected state. An instruction writing to a destination operand register is called its "DEF instruction." An instruction reading a value from a source operand register is called the "USE instruction" of the source operand register. Given a meta-program or main-program instruction, the DEF instruction of its source operand, which can be an instruction from either meta-program or main-program, can be identified by looking for a live predecessor instruction writing to the same register.

Given any two instructions A and B from a pair of threads, of which one thread is a main-program and the other is a meta-program, the precedence relationship between A and B can be stated as follows. An instruction A is said to be a predecessor of an instruction B, if it satisfies the following Boolean equation:

$$(\text{Itag}(A) \leq \text{Itag}(B)) \text{ AND } (\text{MP-instr-ID}(A) \leq \text{MP-instr-ID}(B)) = \text{TRUE}$$

The associated main-program Itag is stored in an internal register, not part of the system state, by the MPCU 204. When the associated main program instruction is completed, this Itag becomes invalid. Therefore, once the associated main-program instruction is completed, the oldest non-speculative main-program instruction's Itag is used as its associated main-program Itag for all the subsequently fetched meta-program instructions.

Having explained the new Itag creation scheme and how to use Itags to identify the relative order of the instructions, it will now be explained how the meta-program Itags can be used by the completion stage of an out-of-order processor pipeline to enforce the correct interleaved execution behavior of meta-program and main-program instructions.

It is possible that meta-program instructions are fetched speculatively due to a control flow modifier instruction such as a conditional branch instruction in a meta-program. For example, such control flow modifier instructions may be used by the meta-program to monitor different execution paths dynamically based on some run-time information.

It should be noted that a meta-program instruction cannot be assigned an Itag until its associated main-program instruction is fetched and assigned an Itag. Furthermore, any meta-program instruction other than a WPC instruction cannot be executed until it is assigned an Itag, and no instruction can be completed without getting assigned a valid Itag. This constraint will block fetching instructions from the meta-program thread beyond the next WPC instruction.

However, a WPC instruction in the wrongly speculated meta-program path can potentially create a situation where the meta-program loses its ability to follow the main-program execution. This scenario can happen due to early completion of a main program instruction to be monitored during the delay in fetching and execution of a WPC instruction in the correct path after a meta-program branch misprediction. Clearly, safe meta-programming practices, such as always sandwiching the control flow modifier instructions (such as conditional branches) between a HIF and RIF instruction pair, can prevent this scenario.

Advancing the Oldest Instruction Pointer

The completion unit 201, using the meta-program Itags and the instruction type information stored in the Global Completion Table (GCT) 207, also known as a re-order buffer, enforces the order of completion of instructions from both threads (or a valid interleaving of instructions) as allowed by the execution semantics of the meta-program. As demonstrated in the flowchart 700 of FIG. 7, the completion unit uses a pointer OldestMProgCtrlInstr to keep track of the oldest meta-program instruction in the GCT that can either control or monitor a main program instruction.

In the following, the actions taken by the completion unit 201 are described, depending on the type of the oldest meta-program instruction in GCT 207 pointed by the OldestMProgCtrlInstr and the value of its associated main-program instruction's Itag.

When the Wait for Program Counter (WPC) instruction is the instruction pointed by OldestMProgCtrlInstr, the following logic is used to advance the pointer used for selecting the oldest completed instructions to commit their results to architected state and retire. Assume that ItagM is the instruction tag of the associated main program instruction and WPCInstrID is the meta-program instruction ID of WPC instruction. Note that WPC is often the first instruction in the sequence of meta-program instructions associated with a main program instruction. Consequently, WPCInstrID is usually assigned zero. The execution semantics of the WPC can be implemented by not allowing to commit any main program instructions with Itag>ItagM until all meta-instructions with Itag=ItagM|WPCInstrID and Itag=ItagM|(WPCInstrID+1) are committed. The '|' indicates the concatenation operation.

When the Halt Instruction Fetch (HIF) instruction is the instruction pointed by OldestMProgCtrlInstr, the following logic is used to advance the pointer used for selecting the oldest completed instructions to commit their results to architected state and retire. Assume that ItagM is the instruction tag of the associated main program instruction and HIFInstrID is the meta-program instruction ID of HIF instruction. The HIF instruction should block the completion of any main-program instruction with an Itag greater than ItagM, its associated main program instruction's Itag. Thus, the execution semantics of the HIF instruction can be implemented by not allowing to commit any main-program instruction with Itag>ItagM until completing the meta-program instruction itself (RIF).

When the Resume Instruction Fetch (RIF) instruction is the instruction pointed by OldestMProgCtrlInstr, the following logic is used to advance the pointer used for selecting the oldest completed instructions to commit their results to architected state and retire. RIF is used for resuming main-program instruction fetch after executing a HIF. Thus the execution semantics of the RIF instruction can be implemented by allowing to commit any main-program instruction with Itag≧ItagM, where ItagM is the Itag of the associated main-program instruction of the RIF instruction.

The Swap Program Counter (SPC) instruction is used for "skipping" main program instructions; it is often used for replacing a sequence of main-program instructions with a sequence of meta-program instructions. When SPC instruction is the instruction pointed by OldestMProgCtrlInstr, the following logic is used to advance the pointer used for selecting the oldest completed instructions to commit their results to architected state and retire. Assume that ItagM is the instruction tag of the associated main program instruction, SPCInstrID is the meta-program instruction ID of the SPC instruction, and newItagM is the Itag of the main-program instruction at the instruction address specified by the operand of SPC instruction.

An SPC instruction is cracked into two micro-ops (micro operations) by the decode unit: one micro-op changes the PC of the main program, and the other micro-op waits for the main program instruction at the swap-address to be fetched and then it forwards the fetched instruction's assigned tag newItagM to its entry in the completion unit. The first micro-op of the SPC instruction sets the next instruction fetch address of the main program thread to the address specified by the operand of SPC instruction. The second micro-op of the SPC instruction temporarily assigns its associated main-program's Itag to newItagM because the new main-program instruction might not have been fetched and assigned an Itag (newItagM).

When the corresponding main-program instruction is fetched and assigned an Itag, it will send the tag to its entry in the completion unit. However an out-of-order execution processor may already have executed some main-program instructions that are to be skipped. Clearly, such instructions need to be flushed. The execution semantics of the SPC can be implemented by flushing all main program instructions with Itags such that:

(Itag≧ItagM) AND (Itag<newItagM)=TRUE.

Note that, since both micro-ops of SPC are always executed, the main-program's fetch address is reset even if those main-program instructions are fetched. This would ensure that the correct data dependencies are established such that the results of meta-program execution are fed to the main-program code starting at SPC target address.

The implementation of four different most frequently encountered meta-program instructions in an out-of-order processor using instruction-specific Itag comparisons and associated execution scenarios has been described in an exemplary embodiment. Those skilled in the art will be able to readily extend the techniques used in these examples to implement new/different meta-program control instructions apparent from the principles shown here.

Whenever wrong speculative execution is identified, the erroneous instructions are flushed. With the new instruction tag creation scheme described herein, it is easy to identify the associated meta-program instructions that need to be flushed when the main-program instructions are flushed due to wrong control flow speculation. Given the Itag StartFlushItag of the oldest main-program instruction to be flushed, it is easy to identify all the younger instructions from both meta-program and main-program threads for flushing—simply select all the instructions such that its main-program part of Itag satisfies the following condition: main-program-Itag≧StartFlushItag.

Exemplary Hardware Implementation

Figure 8:
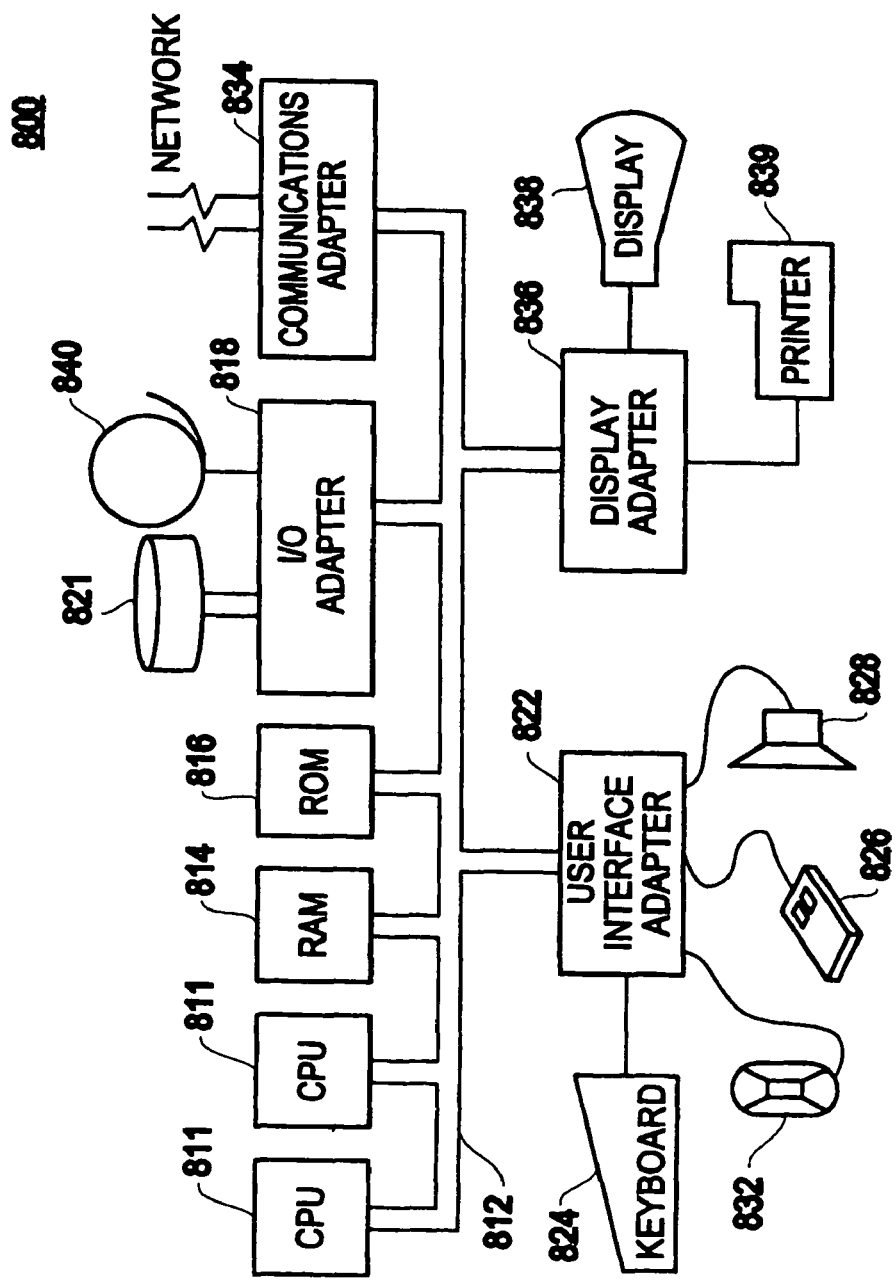
FIG. 8 illustrates an exemplary hardware/information handling system 800 for incorporating the present invention therein.

FIG. 8 illustrates a typical hardware configuration of an information handling/computer system in accordance with the invention, whether implemented as hardware, as a virtual machine, or as a combination of hardware and software modules, and which preferably has at least one processor or central processing unit (CPU) 811.

The CPUs 811 are interconnected via a system bus 812 to a random access memory (RAM) 814, read-only memory (ROM) 816, input/output (I/O) adapter 818 (for connecting peripheral devices such as disk units 821 and tape drives 840 to the bus 812), user interface adapter 822 (for connecting a keyboard 824, mouse 826, speaker 828, microphone 832, and/or other user interface device to the bus 812), a communication adapter 834 for connecting an information handling system to a data processing network, the Internet, an Intranet, a personal area network (PAN), etc., and a display adapter 836 for connecting the bus 812 to a display device 838 and/or printer 839 (e.g., a digital printer or the like).

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, comprising signal-bearing media tangibly embodying a program of machine-readable instructions executable by a digital data processor incorporating the CPU 811 and hardware above, to perform the method of the invention.

This signal-bearing media may include, for example, a RAM contained within the CPU 811, as represented by the fast-access storage for example. Alternatively, the instructions may be contained in another signal-bearing media, such as a magnetic data storage diskette 900 (FIG. 9), directly or indirectly accessible by the CPU 811, or it might be represented as firmware in a controller for a CPU designed to execute as an out-of-order processor.

Whether contained in the diskette 900, the computer/CPU 811, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g., CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code.

CONCLUSION

The current invention is explained herein using a pair of threads—one main program thread and a meta program thread associated with it. However, the technique (e.g., both the exemplary method and the exemplary apparatus) described can be used for speeding up the synchronization between any pair of threads, and therefore to any number of threads. Assume that threads A and B of a multi-threaded program need to synchronize at instruction $I_A$ and $I_B$ of threads A and B, respectively.

Traditionally, this type of synchronization is done using a pair of shared memory variables. For example, as soon as each thread reaches the synchronization point, it sets a unique value to be read by other thread, and it repeatedly reads the value of the shared variable set by the other thread and compares the value read against the unique value indicating the arrival of the other thread at the synchronization point.

In a meta-program-based processor, the synchronization code used by threads A and B can be replaced by the meta-programs associated with threads A and B checking for the fetching of instructions $I_A$ and $I_B$. Such a meta-program-based synchronization scheme can speed up the execution of the threads by avoiding repeated accesses to shared memory variables. Similar meta-program-based synchronization schemes can be used as a replacement for other type of synchronization constructs needed (for example, implementing critical sections) in multi-threaded programs.

As a final note, in relating the role of the present invention with conventional out-of-order and in-order procedures and with the meta-program-based processor discussed in the co-pending application, the co-pending application only describes the semantics of execution of main-program and meta-program on a processor that can fetch and execute instructions. That processor can be an in-order processor or out-of-order processor. The co-pending application teaches the correct order in which the results of execution of instructions are committed to the processor state (comprising registers and memory). It is noted that almost all out-of-order processors use some kind of instruction tags for tracking the instructions. In contrast, instruction tags are not needed, in general, in an in-order processor.

An exemplary key feature of the present invention is that of providing a simple technique using a special type of Itags and a special type of instruction-specific Itag-comparators (exemplarily demonstrated as being hardware), to give the illusion of meta-program execution semantics while executing instructions from both threads out-of-order and speculatively. Modern processors use speculative and out-of-order execution of instructions in order to achieve higher performance than in-order execution processors by avoiding false data dependencies between instructions.

Unfortunately, if the execution semantics of meta-program execution is enforced by strictly alternating the instruction fetch and execution between main and meta-program threads in an speculative out-of-order execution processor (e.g., as described by the co-pending application), the performance will be relatively bad, because such process is not exploiting the out-of-order and speculative execution capabilities of the out-of-order processor.

In contrast, the present invention teaches a technique to allow speculative out-of-order execution of instructions from main- and meta-program threads in an out-of-order processor (thus, tapping the full benefits of out-of-order execution) and at the same time enforcing the execution semantics of meta-program by restricting the order of completion of instructions from both threads as well as throttling the fetch.

This combination of elements and capabilities is new to the art.

While the current invention has been described in terms of using hardware structures for supporting speculative and out-of-order execution of meta-program and main-program instructions, it is possible to implement the method of the current invention entirely or parts of it by a software layer.

One such of software implementations is typically called a "Virtual Machine" (VM). It is possible to design such a VM to emulate the behavior of a meta-program-based speculative out-of-order processor. In such a meta-program-based VM system, the functions such as fetching (as well as throttling of instruction fetch), decoding, assigning instruction tags, and interpretation, execution and completion of meta-program and main-program instructions is done by a system software layer called the VM layer close to the processor hardware. The processor hardware used by such a VM system may or may not use the same instruction set architecture the main-program and meta-programs is written.

Thus, while the present invention has been described in terms of an exemplary embodiment, those skilled in the art will recognize that the invention can be practiced with modification within the spirit and scope of the appended claims.

Further, it is noted that Applicants' intent is to encompass equivalents of all claim elements, even if amended later during prosecution.

Having thus described our invention, what I claim as new and desire to secure by Letters Patent is as follows:

1. An apparatus, comprising:
    an out-of-order processor executing at least two threads of instructions that communicate and synchronize with each other as two concurrent co-routine threads, wherein said two concurrent co-routine threads result because a synchronization of said at least two threads is achieved by monitoring addresses of instructions in at least one of said at least two threads without modifying, changing, or altering the threads, said monitoring of addresses being controlled by an occurrence of an instruction in an execution of a first thread that is monitoring a second thread,
    wherein two of said at least two threads comprise:
        a main program thread of a main program; and
        an associated meta-program thread, wherein said meta-program thread monitors addresses of said main program thread, as controlled by a specific instruction in said meta-program thread, and said meta-program thread comprises a thread in a meta-program that fetches and stores meta-program information of executing the main program, wherein an execution of said meta-program does not alter an original binary code of said main program,
    wherein said out-of-order processor comprises an instruction decoder having a meta-program control unit (MPCU) that generates a meta-program instruction tag for each meta-program instruction to be processed, said meta-program instruction tag comprising a plurality of portions, wherein:
one of the portions identifies a main program instruction associated with said meta-program instruction to be processed; and
another of the portions provides an identification scheme of all meta-program instructions to be processed with the associated main program instruction,
said out-of-order processor further comprising:
a storage structure to store meta-program instructions; and
a completion unit to:
track an oldest meta-program instruction in said storage structure that can one of control and monitor a main program instruction; and
retire instructions completely executed from both threads in an interleaved order specified by the meta-program control instruction.

2. The apparatus of claim 1, wherein said synchronization is achieved in threads being executed in a speculative manner and in threads being executed in a non-speculative manner.

3. The apparatus of claim 1, wherein said monitoring comprises setting a bit for main program instructions fetched from any of the monitored addresses.

4. The apparatus of claim 1, wherein said out-of-order processor further comprises a logic comparator using said meta-program tag to determine a precedence relationship between a pair of threads, one of which comprises a main-program thread and the other comprises a meta-program thread.

5. The apparatus of claim 1, wherein said oldest meta-program instruction is tracked using a pointer and said completion unit controls said pointer based on which instruction is currently said oldest meta-program instruction.

6. The apparatus of claim 1, wherein a pair of main program threads are synchronized by using meta-program threads associated respectively with said pair of main program threads to replace instruction sequences in threads used for implementing a shared-memory-based synchronization.

7. The apparatus of claim 1, wherein a software layer emulates an execution of said meta-program thread.

8. The apparatus of claim 1, wherein said at least two threads comprise a pair of concurrent co-routine threads capable of fetching and executing in both a speculative manner and an out-of-order manner.

9. The apparatus of claim 1, wherein said specific instruction in said associated meta-program thread comprises a Wait for Program Counter (WPC) instruction that includes one or more addresses for said monitoring.

10. The apparatus of claim 1, wherein said two threads being concurrent co-routine threads means that one or more of the at least two threads are not spawned immediately prior to communicating and synchronizing with each other and that none of the at least two threads are terminated, flushed, or merged together immediately after communicating and synchronizing with each other.

11. The apparatus of claim 1, wherein at least a portion of said meta-program effectively replaces a part of a main program thread, so that said co-routine threads call on each other as if a called co-routine thread were a subroutine of the calling co-routine thread, in which case only one of the two co-routine threads are executing.

12. A method of synchronizing two threads in an out-of-order processing, said method comprising:
monitoring addresses of instructions in at least one of said two threads being executed by a processor on a computer, said two threads thereby comprising two concurrent co-routine threads, said monitoring being controlled by a specific instruction in a first thread to monitor addresses of a second thread,
wherein said two threads comprise:
a main program thread of a main program; and
an associated meta-program thread,
wherein said meta-program thread is monitoring addresses of said main program thread, and said meta-program thread comprises a thread of a meta-program that fetches and stores meta-program information of executing the main program,
said out-of-order processing further comprising:
storing meta-program instructions in a storage structure;
tracking an oldest meta-program instruction in said storage structure that can one of control and monitor a main program instruction; and
retiring instructions completely executed from both threads in an interleaved order specified by the meta-program control instruction.

13. The method of claim 12, further comprising generating a meta-program instruction tag for each meta-program instruction to be processed, said meta-program instruction tag comprising a plurality of portions, wherein:
one of the portions identifies a main program instruction associated with said meta-program instruction to be processed; and
another of the portions provides an identification scheme of meta-program instructions to be processed with the associated main program instruction.

14. The method of claim 12, further comprising setting a bit for main program instructions fetched from any of the monitored addresses.

15. The method of claim 12, wherein a pair of main program threads are synchronized by using meta-program threads associated respectively with said pair of main program threads to replace instruction sequences in the threads used for implementing a shared-memory-based synchronization.

16. The method of claim 12, wherein said oldest meta-program instruction is tracked using a pointer and said completion unit controls said pointer based on which instruction is currently said oldest meta-program instruction.

17. A non-transitory computer-readable storage medium tangibly embodying a program of machine-readable instructions executable by a digital processing apparatus capable of an out-of-order processing for a method of out-of-order processing, said method comprising:
in said out-of-order processing, executing at least two threads of instructions that communicate and synchronize with each other as two concurrent co-routine threads,
wherein synchronizing said at least two threads is based on a process of monitoring addresses of instructions in at least one of said at least two threads, said monitoring being controlled by a specific instruction in a first thread to monitor addresses of a second thread, and
wherein said two threads being concurrent co-routine threads means that one or more of the at least two threads are not spawned immediately prior to communicating and synchronizing with each other and that none of the at least two threads are terminated or merged together immediately after communicating and synchronizing with each other,
wherein said two threads comprise:
a main program thread of a main program; and
an associated meta-program thread, wherein said meta-program thread is monitoring addresses of said main program thread, and said meta-program thread comprises a thread of a meta-program that fetches and stores meta-program information of executing the main program, said method further comprising:

storing meta-program instructions in a storage structure;

tracking an oldest meta-program instruction in said storage structure that can one of control and monitor a main program instruction; and retiring instructions completely executed from both threads in an interleaved order specified by the meta-program control instruction.

18. The computer-readable storage medium of claim 17, as comprising one of:

a Read Only Memory (ROM) for controlling an execution of an out-of-order processing;

a Random Access Memory (RAM) for storing instructions on a computer capable of executing an out-of-order processing or for downloading said instructions to another machine on a network; and a stand-alone medium selectively inserted into a drive unit of a computer capable of executing an out-of-order processing, said stand-alone medium containing instructions for executing an out-of-order processing as based on said monitoring addresses, for downloading said instructions onto said computer.

* * * * *